(12) United States Patent
Fatemi et al.

(10) Patent No.: US 11,936,239 B2
(45) Date of Patent: Mar. 19, 2024

(54) BI-MATERIAL PERMANENT MAGNETS FOR ELECTRIC MACHINES

(71) Applicant: GM GLOBAL TECHNOLOGY OPERATIONS LLC, Detroit, MI (US)

(72) Inventors: Alireza Fatemi, Canton, MI (US); Anil K. Sachdev, Rochester Hills, MI (US); Jian Yao, Shanghai (CN); Anthony M. Coppola, Rochester Hills, MI (US); Thomas W. Nehl, Shelby Township, MI (US); Chengwu Duan, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 578 days.

(21) Appl. No.: 17/116,661

(22) Filed: Dec. 9, 2020

(65) Prior Publication Data

US 2022/0166264 A1 May 26, 2022

(30) Foreign Application Priority Data

Nov. 26, 2020 (CN) .......................... 202011346829.9

(51) Int. Cl.
| | |
|---|---|
| H02K 1/02 | (2006.01) |
| H01F 1/032 | (2006.01) |
| H01F 1/053 | (2006.01) |
| H01F 41/02 | (2006.01) |
| H02K 1/2793 | (2022.01) |
| H02K 1/32 | (2006.01) |
| H02K 15/03 | (2006.01) |
| H02K 21/24 | (2006.01) |

(52) U.S. Cl.
CPC ............... *H02K 1/02* (2013.01); *H01F 1/032* (2013.01); *H01F 1/053* (2013.01); *H01F 41/0253* (2013.01); *H01F 41/0266* (2013.01); *H02K 1/2793* (2013.01); *H02K 1/32* (2013.01); *H02K 15/03* (2013.01); *H02K 21/24* (2013.01)

(58) Field of Classification Search
None
See application file for complete search history.

(56) References Cited

U.S. PATENT DOCUMENTS

| | | | | |
|---|---|---|---|---|
| 4,837,144 A | * | 6/1989 | Sugiyama | C12Q 1/527 436/175 |
| 6,025,667 A | * | 2/2000 | Narita | H02K 1/2766 310/156.53 |
| 6,331,214 B1 | * | 12/2001 | Koga | B23K 20/16 428/685 |
| 6,359,359 B1 | * | 3/2002 | Miura | H02K 1/276 310/156.43 |

(Continued)

OTHER PUBLICATIONS

U.S. Appl. No. 16/460,138, filed Jul. 2, 2019, Nehl et al.

(Continued)

*Primary Examiner* — Kevin M Bernatz

(57) ABSTRACT

A bi-material permanent magnet for an electric machine includes a core including a first magnetic material and a shell portion located on the core and made of a second magnetic material. The first magnetic material comprises a magnet material with an energy less than 20 Mega Gauss Oersteds (MGOe). The second magnetic material comprises a magnet material with an energy greater than 30 MGOe.

20 Claims, 8 Drawing Sheets

(56) References Cited

U.S. PATENT DOCUMENTS

| | | | | |
|---|---|---|---|---|
| 7,843,100 | B2* | 11/2010 | Blissenbach | H02K 1/2766 310/156.43 |
| 10,476,324 | B2* | 11/2019 | Hosek | H02K 21/24 |
| 10,965,177 | B2* | 3/2021 | Wawrzyniak | H02K 1/278 |
| 2002/0000262 | A1* | 1/2002 | Ono | B82Y 25/00 420/83 |
| 2006/0061226 | A1* | 3/2006 | Kim | H02K 1/278 310/156.43 |
| 2010/0171386 | A1* | 7/2010 | Kogure | H02K 1/276 310/156.43 |
| 2011/0210636 | A1* | 9/2011 | Kuhlmann-Wilsdorf | H02K 31/00 310/178 |
| 2012/0262019 | A1* | 10/2012 | Smith | H02K 21/24 335/302 |
| 2014/0132376 | A1* | 5/2014 | Jin | C22C 38/10 75/346 |
| 2017/0098971 | A1* | 4/2017 | Kobayashi | H02K 1/2713 |
| 2018/0174722 | A1* | 6/2018 | Zhang | H01F 1/055 |
| 2019/0357386 | A1 | 11/2019 | Coppola et al. | |
| 2019/0363598 | A1 | 11/2019 | Coppola et al. | |
| 2020/0103179 | A1 | 4/2020 | Coppola et al. | |
| 2020/0161938 | A1 | 5/2020 | Fatemi et al. | |
| 2020/0162005 | A1 | 5/2020 | Fatemi et al. | |
| 2020/0169129 | A1 | 5/2020 | Fatemi et al. | |
| 2020/0195071 | A1 | 6/2020 | Fatemi et al. | |
| 2020/0227955 | A1 | 7/2020 | Fatemi et al. | |
| 2020/0235440 | A1 | 7/2020 | Hao et al. | |

OTHER PUBLICATIONS

U.S. Appl. No. 16/527,846, filed Jul. 31, 2019, Wang et al.
U.S. Appl. No. 16/531,631, filed Aug. 5, 2019, Coppola et al.
U.S. Appl. No. 16/531,638, filed Aug. 5, 2019, Coppola et al.
U.S. Appl. No. 16/533,176, filed Aug. 6, 2019, Coppola et al.
U.S. Appl. No. 16/570,217, filed Sep. 13, 2019, Lahr et al.
U.S. Appl. No. 16/589,583, filed Oct. 1, 2019, Fatemi et al.
U.S. Appl. No. 16/656,048, filed Oct. 17, 2019, Fatemi et al.
U.S. Appl. No. 16/662,862, filed Oct. 24, 2019, Coppola et al.
U.S. Appl. No. 16/671,732, filed Nov. 1, 2019, Samie et al.
U.S. Appl. No. 16/678,486, filed Nov. 8, 2019, Nehl et al.
U.S. Appl. No. 16/691,925, filed Nov. 22, 2019, Fatemi et al.
U.S. Appl. No. 16/701,528, filed Dec. 3, 2019, Coppola et al.
U.S. Appl. No. 16/701,640, filed Dec. 3, 2019, Coppola.
U.S. Appl. No. 16/701,693, filed Dec. 3, 2019, Coppola et al.
U.S. Appl. No. 16/710,772, filed Dec. 11, 2019, Liu et al.
U.S. Appl. No. 16/724,998, filed Dec. 23, 2019, Liu et al.
U.S. Appl. No. 16/736,185, filed Jan. 7, 2020, Yang et al.
U.S. Appl. No. 16/736,203, filed Jan. 7, 2020, Lahr et al.
U.S. Appl. No. 16/737,434, filed Jan. 8, 2020, Yang et al.
U.S. Appl. No. 16/774,696, filed Jan. 28, 2020, Gopalakrishnan et al.
U.S. Appl. No. 16/780,308, filed Feb. 3, 2020, Hao et al.
U.S. Appl. No. 16/782,681, filed Feb. 5, 2020, Nehl et al.
U.S. Appl. No. 16/800,625, filed Feb. 25, 2020, Coppola et al.
U.S. Appl. No. 16/860,695, filed Apr. 28, 2020, Yan et al.
U.S. Appl. No. 16/944,578, filed Jul. 31, 2020, Fatemi et al.
AZoM. "The Powder Injection Moulding Process". https://www.azom.com/article.aspx?ArticleID=1080. Nov. 29, 2001; 6 pages.

* cited by examiner

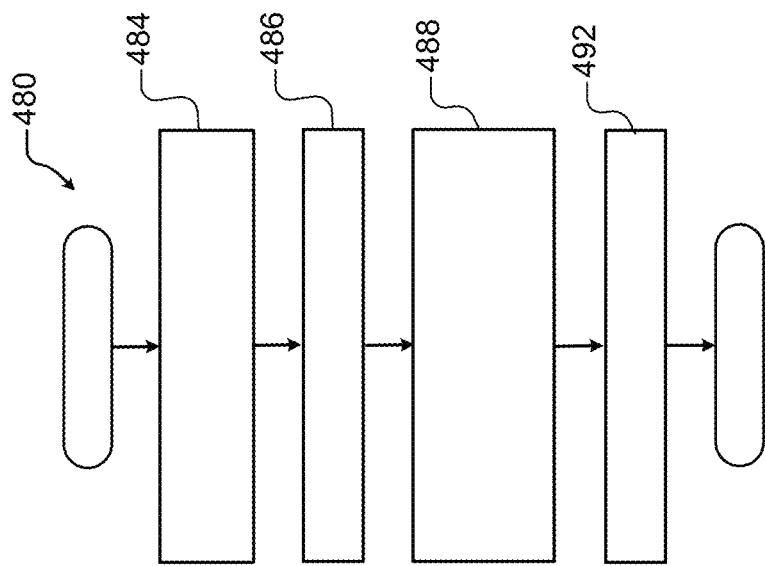
FIG. 4C
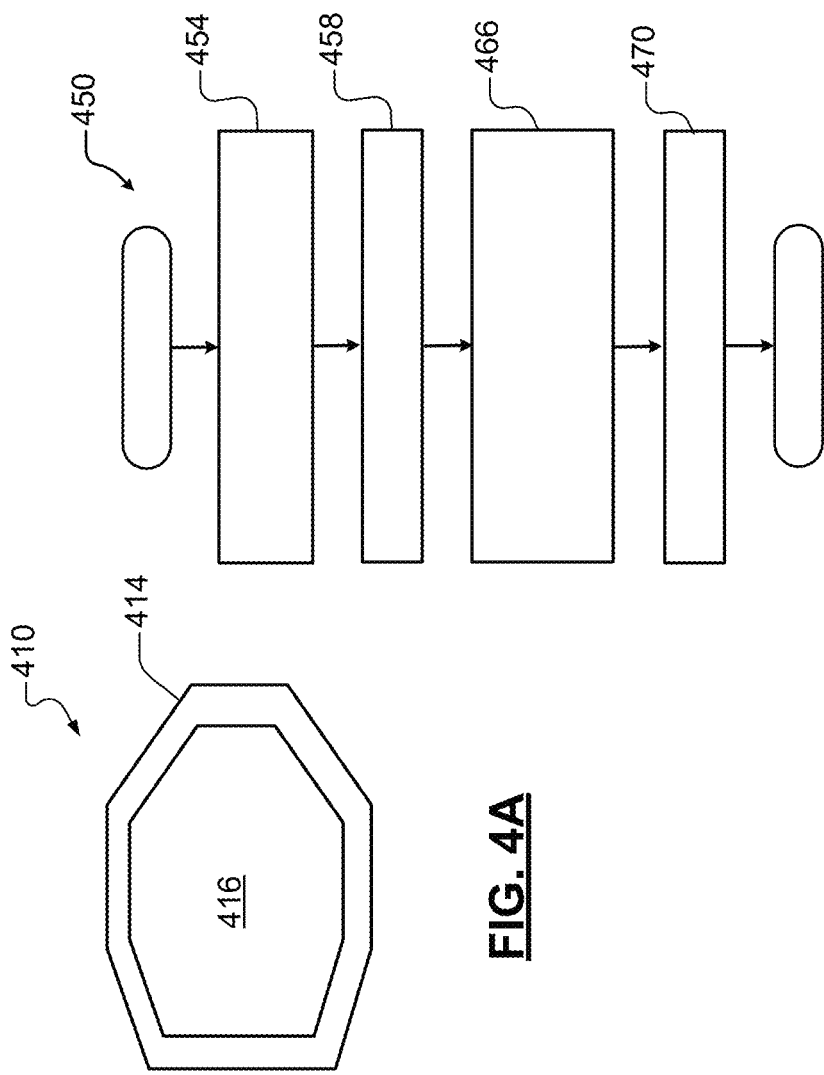
FIG. 4B
FIG. 4A

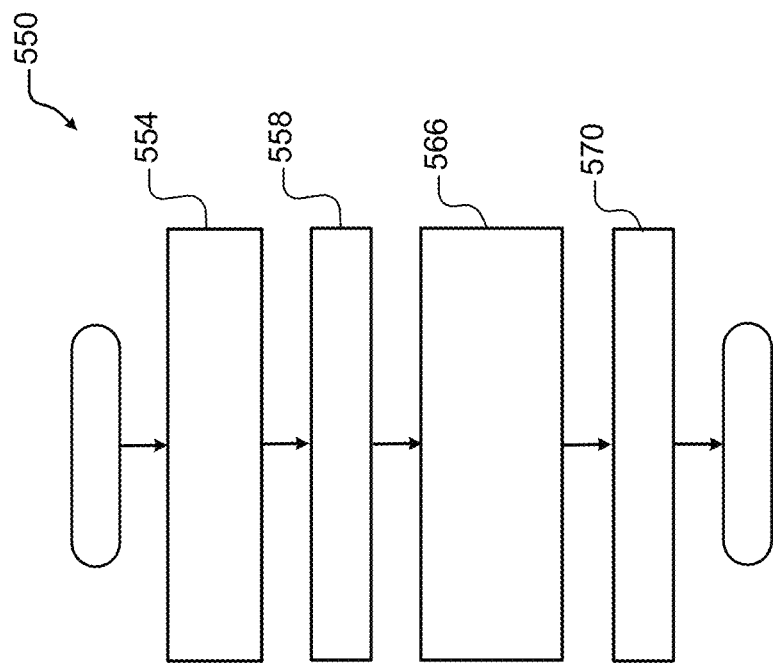
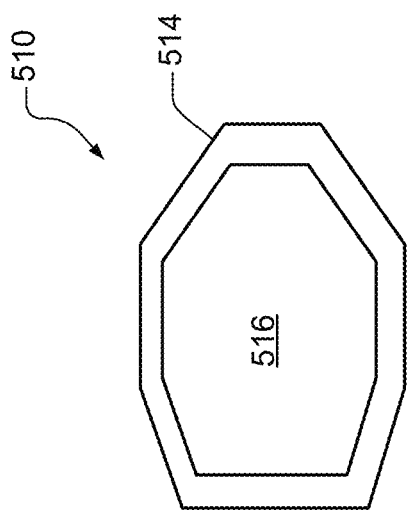

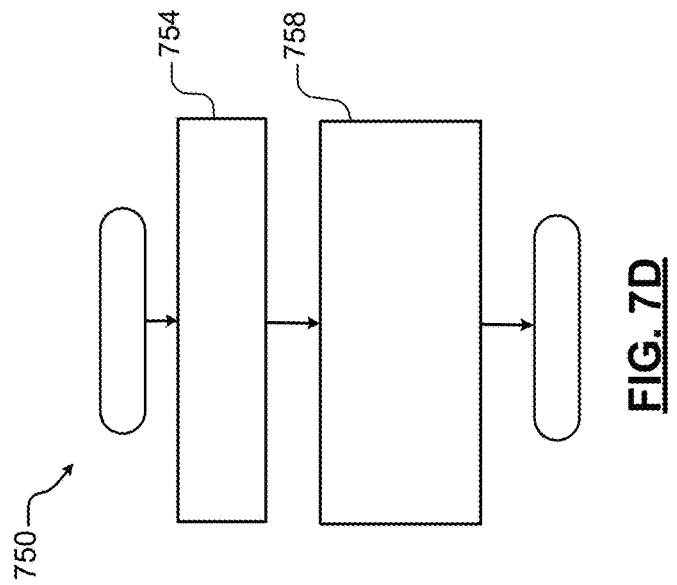
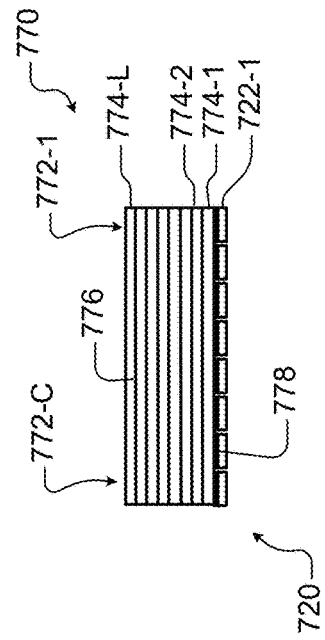
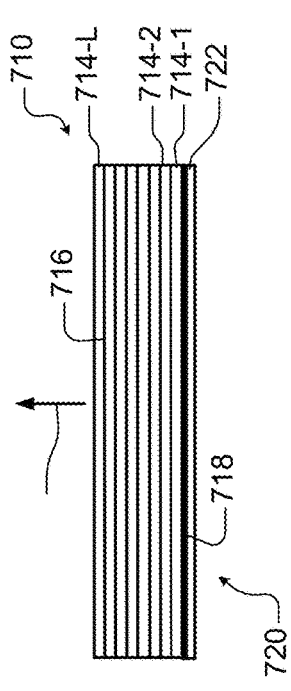
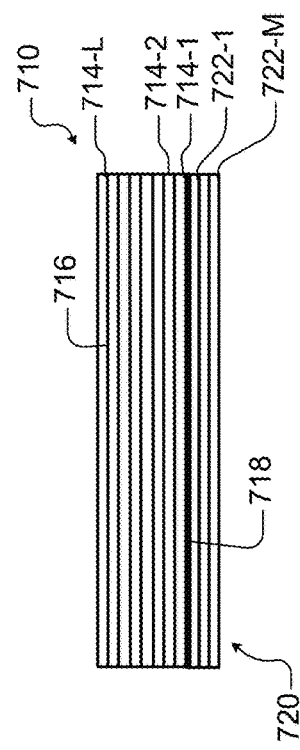

BI-MATERIAL PERMANENT MAGNETS FOR ELECTRIC MACHINES

CROSS-REFERENCE TO RELATED APPLICATIONS

This application claims the benefit of Chinese Patent Application No. 202011346829.9, filed on Nov. 26, 2020. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to permanent magnets for electric machines and more particularly to bi-material permanent magnets for electric machines.

Permanent magnet electric machines such as motors are typically used in hybrid and electric vehicles to provide propulsion. Performance can be improved by using permanent magnets having high magnetic coercivity (referred to herein as high energy magnets). High energy magnets are currently made using rare-earth elements. Use of rare-earth permanent magnets in high-volume electric machines is expensive and likely unsustainable. Efforts have been made to replace rare-earth permanent magnets with lower energy magnets having lower magnetic coercivity. However, lower energy magnets may experience irreversible demagnetization during operation. Low energy magnets produce less torque and may not be able to meet the requirements in the future for electric motors for vehicles and other electric machine applications.

SUMMARY

A bi-material permanent magnet for an electric machine includes a core including a first magnetic material and a shell portion located on the core and made of a second magnetic material. The first magnetic material comprises a magnet material with an energy less than 20 Mega Gauss Oersteds (MGOe). The second magnetic material comprises a magnet material with an energy greater than 30 MGOe.

In other features, the shell portion and the core form a single body. The shell portion covers an outer surface of the core. The shell portion partially covers at least one surface of the core. The shell portion has a uniform thickness on the core. The shell portion has a variable thickness on the core.

In other features, the shell portion includes a first shell portion located on a first circumferential-facing surface of the core. The shell portion includes a second shell portion located on a second circumferential-facing surface of the core that is located opposite to the first circumferential-facing surface. The second magnetic material comprises a rare earth magnetic material and the first magnetic material is selected from a group consisting of a hard magnetic material and a hard magnetic compound. One or more cooling channels are formed in the first magnetic material. The cooling channels extend from one side of the core to an opposite side of the core.

In other features, the core is made of a laminate including L layers of the first magnetic material that are bonded together, where L is an integer greater than or equal to one. The shell portion is bonded to the core and includes M layers of the second magnetic material, where M is an integer greater than or equal to one. The shell portion is subdivided in a plane transverse to a direction of magnetization.

An axial flux machine includes a stator and a first rotor configured to rotate relative to the stator and including a plurality of the bi-material permanent magnets. A second rotor is configured to rotate relative to the stator and including a plurality of the bi-material permanent magnets. The first rotor and the second rotor are arranged adjacent to first surface and a second surface of the stator, respectively.

A radial flux machine including a stator and a rotor configured to rotate relative to the stator and including a plurality of the bi-material permanent magnets.

A method for making a bi-material permanent magnet for an electric machine includes providing a core including a first magnetic material and depositing a shell portion made of a second magnetic material onto the core by supplying powder including the second magnetic material onto the core and heating the core and the powder using a laser. The first magnetic material comprises a magnet material with an energy less than 20 Mega Gauss Oersteds (MGOe) and the second magnetic material comprises a magnet material with an energy greater than 30 MGOe.

In other features, the powder including the second magnetic material is sprayed onto the core. The shell covers an outer surface of the core. The shell covers at least one surface of the core. The shell has a uniform thickness on the core. The shell has a variable thickness on the core. Depositing the shell includes depositing a first shell portion on a first circumferential-facing surface of the core and depositing a second shell portion on a second circumferential-facing surface of the core.

In other features, the second magnetic material comprises a material selected from a group consisting of neodymium and samarium-cobalt and the first magnetic material is selected from a group consisting of a hard magnetic material and a hard magnetic compound.

A method for making a bi-material permanent magnet for an electric machine including selecting a first magnetic material producing an energy less than 20 Mega Gauss Oersteds (MGOe); selecting a second magnetic material producing an energy greater than 30 MGOe; creating a shell using the second magnetic material, wherein the shell defines a cavity; and filling the cavity of the shell with the first magnetic material.

In other features, filling the cavity of the shell with the first magnetic material includes filling the cavity with powder including the first magnetic material and adhesive and applying at least one of pressure and heat. Filling the cavity of the shell with the first magnetic material includes injection molding the first magnetic material into the cavity.

In other features, the method includes adding sacrificial material in desired locations for one or more cooling channels prior to filling the cavity with the first magnetic material and after filling the cavity with the first magnetic material, removing the sacrificial material to form the one or more cooling channels. The one or more cooling channels extend through the core.

A method for making a bi-material permanent magnet for an electric machine includes selecting a first magnetic material producing an energy less than 20 Mega Gauss Oersteds (MGOe); selecting a second magnetic material producing an energy greater than 30 MGOe; creating a core using the first magnetic material; and forming a shell around the core using the second magnetic material.

In other features, the method includes forming the shell around the core using the second magnetic material includes arranging the core in a die, supplying powder including the second magnetic material into the die around the core, and using an isostatic press and a source of heat to sinter the powder. The powder is mixed with an adhesive prior to using the isostatic press.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4A is a side cross-sectional view of another example of a bi-material permanent magnet including a shell made of the second magnetic material that is filled with the first magnetic material to form a core according to the present disclosure;

FIG. 4B is a flowchart of an example of a method for manufacturing bi-material permanent magnets of FIG. 4A according to the present disclosure;

FIG. 4C is a flowchart of an example of a method for manufacturing bi-material permanent magnets according to the present disclosure;

FIG. 5A is a side cross-sectional view of an example of a bi-material permanent magnet including a shell made of the second magnetic material that is filled with the first magnetic material using injection molding to form the core according to the present disclosure;

FIG. 5B is a flowchart of an example of a method for manufacturing bi-material permanent magnets of FIG. 5A according to the present disclosure;

FIG. 7A is a side cross-sectional view of an example of a bi-material permanent magnet including a laminated core and a shell according to the present disclosure;

FIG. 7B is a side cross-sectional view of an example of a bi-material permanent magnet including a laminated core and a laminated shell according to the present disclosure;

FIG. 7C is a side cross-sectional view of an example of a portion of a rotor including a bi-material permanent magnet according to FIGS. 7A and 7B according to the present disclosure;

FIG. 7D is a flowchart of an example of a method for manufacturing the bi-material permanent magnets according to FIGS. 7A and 7B;

FIG. 7E is a side cross-sectional view of another example of a bi-material permanent magnet including a laminated core and a laminated shell according to the present disclosure;

In the drawings, reference numbers may be reused to identify similar and/or identical elements.

DETAILED DESCRIPTION

While the foregoing disclosure relates to permanent magnets for electric motors for providing propulsion for vehicles, the bi-material permanent magnets may be used in other types of electric machines.

Bi-material permanent magnets for electric machines according to the present disclosure are made with two different magnet materials. Several methods are presented for fabricating the permanent magnets according to the present disclosure. Bi-material permanent magnets according to the present disclosure include a core and an outer layer or shell. The core is made of a first magnetic material and the outer layer or shell is made of a second magnetic material that is different than the first magnetic material. In some examples, the two materials are melted or bonded together at an interface therebetween and form a single body. In other examples, the core and/or the shell are made of a laminate and are bonded together.

In some examples, the first magnetic material includes low-energy, low-coercivity magnetic material. In some examples, the second magnetic material includes a high-energy, high-coercivity material. In some examples, the first magnetic material comprises a magnet material producing an energy less than 20 Mega Gauss Oersteds (MGOe) and the second magnetic material comprises a magnet material producing an energy greater than 30 MGOe. In some examples, the second magnetic material includes one or more rare earth magnet materials.

Bi-material permanent magnets according to the present disclosure allow use of low-energy magnet material in demanding electric machine applications that would normally require high-energy magnet material and improves the performance of electric machines with low energy magnets.

Replacing some of the low-energy magnet material can also provide design flexibility. For example, an electric machine using low-energy magnet material for the magnets can be optimized by replacing some of the low-energy magnet material with high energy magnetic material. For example, adding a 1 mm Nd layer and removing 3 mm of a Fe core can improve the torque by saturating the bridges ~20%.

In some examples, the bi-material permanent magnets according to the present disclosure are fabricated using a low-cost ferrite magnet core. A laser deposition process is used to deposit a shell or shell portion made of a rare-earth magnet material onto the low-cost ferrite magnet core. In another example, a rare-earth magnetic material is formed into a shell including a cavity and then the shell is filled with the low-cost ferrite magnet material. In another example, the core includes a block of low-cost ferrite magnetic core material. One or more layers of rare-earth magnetic material are attached or bonded to one or more sides of the core using adhesive. Still other examples will be described further below.

Figure 1:
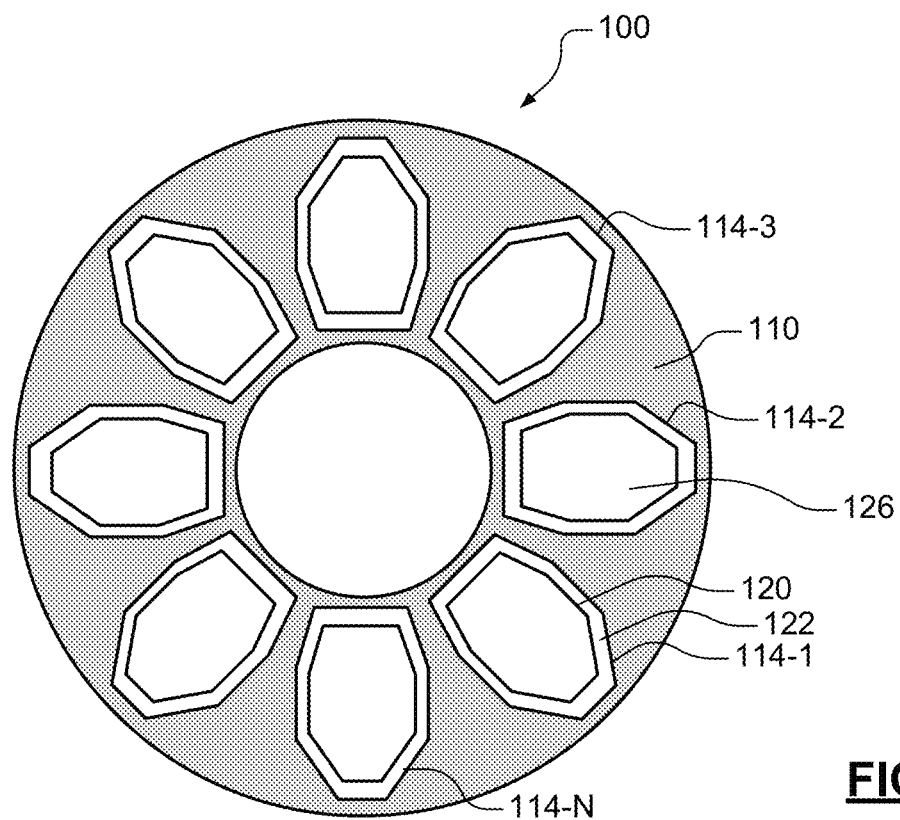
FIG. 1 illustrates an example of a rotor including bi-material permanent magnets according to the present disclosure.
Figure 2:
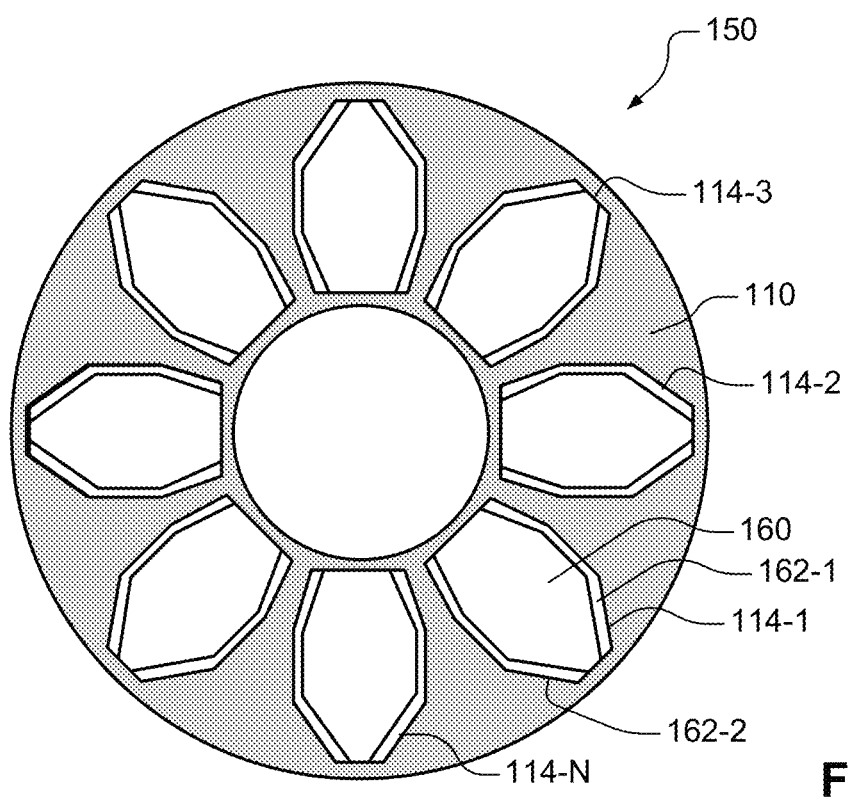
FIG. 2 illustrates another example of a rotor including bi-material permanent magnets according to the present disclosure.

Referring now to FIGS. 1 and 2, examples of rotors with bi-material permanent magnets according to the present disclosure are shown. In FIG. 1, a rotor 100 includes a rotor portion 110 defining slots for receiving bi-material permanent magnets 114-1, 114-2, . . . , and 114-N (collectively and/or individually bi-material permanent magnets 114) at radial locations around the rotor portion 110. The bi-material permanent magnets 114 include a core 120 made of a first magnetic material and a shell 122 made of a second magnetic material. The core 120 and the shell 122 form a single body. In some examples, an electric machine includes the rotor and a stator.

In some examples, the first magnetic material comprises a low-energy, low-coercivity magnet material. In some examples, the first magnetic material comprises a magnet material producing an energy less than 20 MGOe. In some examples, the second magnetic material comprises a high-energy, high-coercivity material. In some examples, the second magnetic material comprises a magnet material producing an energy greater than 30 MGOe. In other examples, the core 120 is made of hard magnetic materials or a hard magnetic compound.

In some examples, the shell 122 covers the entire outer surface of the core 120. In other examples, the shell 122 only partially covers one or more portions, sides or other features of the outer surface of the core 120. In both cases, the shell 122 may have a uniform thickness or the thickness may vary around the core 120. In FIG. 1, the shell 122 covers sides of the core 120 as shown but not a top surface 126 or a bottom surface in FIG. 1.

In FIG. 2, a rotor 150 includes the bi-material permanent magnets 114. A core 160 is made of a first magnetic material and shell portions 162-1 and 162-2 (collectively shell portions 162) are made of a second magnetic material. The core 160 and the shell portion 162 form a single body. As can be seen, the shell portions 162-1 and 162-2 cover circumferential-facing side surfaces of the core 160 but not radially inner and radially outer side portions of the core 160. As can be appreciated, the shell portion 162 can be deposited in different locations on the core 160 and can have different patterns than those shown in FIG. 2 to meet performance and cost targets. As can be appreciated, edges of low energy permanent magnets are areas that are prone to demagnetization. By using the high-energy magnet material on the edges, the risk of demagnetization can be reduced or eliminated.

Figure 3A:
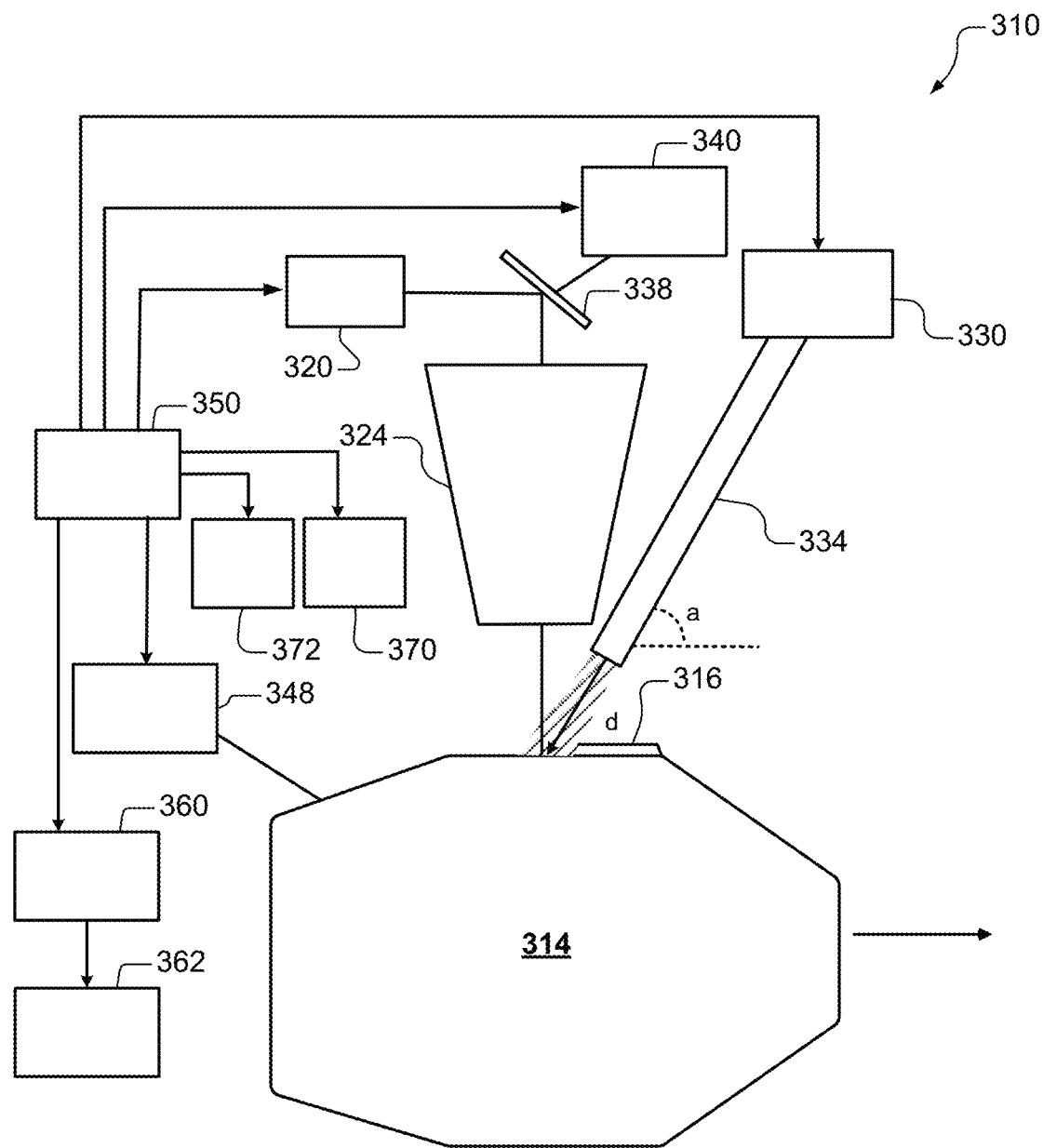
FIG. 3A is a functional block diagram of an example of a laser deposition system for depositing a shell made of a second magnetic material onto a core made of a first magnetic material according to the present disclosure.

Referring now to FIG. 3A, an example of a laser deposition system 310 is shown for manufacturing the bi-material permanent magnets. A laser 320 directs light onto a surface of a core 314 to heat the powder and/or the core 314. A shroud 324 may be arranged around the laser 320 adjacent the core and near the delivery of the powder.

In some examples, a powder source 330 supplies powdered magnetic material through a conduit 334 onto the surface of the core 314. The laser 320 heats both the powder and an outer surface of the core to cause melting and to form a layer. The process may be repeated one or more times to provide a predetermined thickness.

In some examples, the powder source 330 includes a container including powder, a powder pickup, and a source of compressed gas (all not shown) that entrains the powder so that it can be directed onto the core. In other examples, the powder is fed by gravity. In some examples, the laser 320 supplies the coherent light at approximately a right angle relative to the surface of the core and the powder is delivered at an acute angle relative to the surface. In other examples, a mirror 338 may be used to direct and/or scan the laser light onto the core 314. In some examples, a mirror positioning device 340 is used to adjust a position of the mirror 338 to scan laser light across the core 314.

Heat from the laser 320 melts the powder falling on an outer surface of the core 314. The laser 320 also melts a surface of the core 314 to create an alloy including the first and second magnetic materials and to form an outer shell or shell portions 316 of the second magnetic material. The core 314 may be moved linearly, laterally and/or rotated relative to the laser deposition system 310 or vice versa during processing. In some examples, a core positioning device 348 may be used to rotate or move the core 314 in 1, 2 or 3 axes to further control a location of deposition onto the core 314.

At times, alignment of magnetic domains in the first and/or second magnetic material is performed during and/or after deposition of one or more layers or after a portion of a layer is deposited. In some examples, the bi-material permanent magnet is arranged relative to one or more coils 362 that are selectively energized by a coil energizer 360 to create a magnetic field. For example, the coil 362 may be arranged around the core 314 and other portions of the laser deposition system and/or the core is moved to the coil 362 and returned for additional deposition one or more times. In some examples, a temperature sensor 370 may be used to sense a temperature of the core and/or the shell. In other examples, the process is performed in an enclosure and a temperature sensor 370 may be used to sense a temperature inside the enclosure. In some examples, a heater 372 may be provided to heat the core and/or the shell and/or to provide a predetermined temperature inside the enclosure.

In some examples, the magnetic domain alignment is performed at a temperature that is less than or equal to the melting temperature and greater than or equal to a Curie temperature or point. In some examples, the second magnetic material is selected from a group consisting of neodymium and samarium-cobalt magnets. Neodymium magnets have a Curie temperature of 300-400° C. and a melting temperature of about 1000° C. Samarium-cobalt magnets have a Curie temperature of 720-800° C. and a melting temperature of about 1300° C.

In some examples, the laser heating is relatively localized during deposition and the magnetic domain alignment is performed at the same time or overlaps periods that the second magnetic material is being deposited. In some examples, the core is heated to a temperature above the Curie temperature during deposition and the magnetic domain alignment is performed before, after or during deposition of the second magnetic material while the temperature of the core and/or the shell is above the Curie temperature.

Figure 3B:
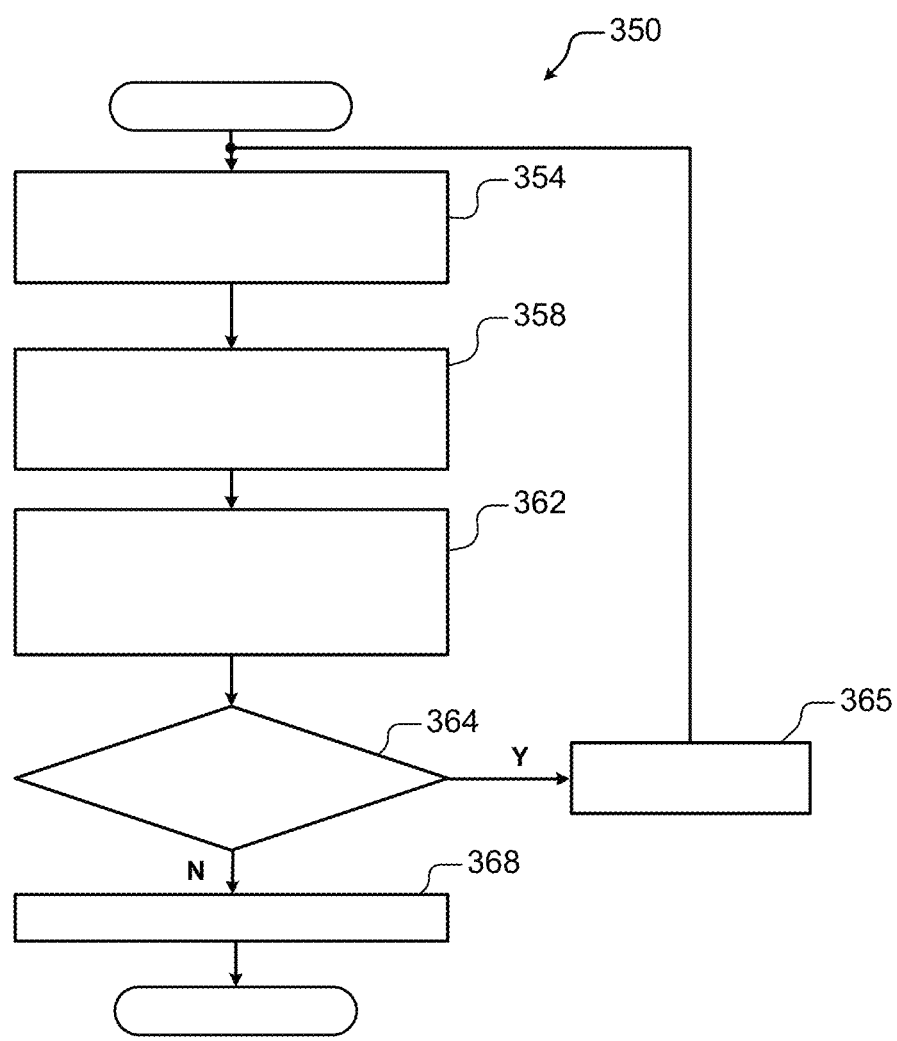
FIG. 3B is a flowchart of an example of a method for manufacturing a bi-material permanent magnet of FIG. 3A according to the present disclosure.

Referring now to FIG. 3B, a method 350 for manufacturing the bi-material permanent magnets is shown. At 354, a core made of the first magnetic material is positioned relative to the laser and a source of powder comprising the second magnetic material. At 358, the powder is directed onto the core by gravity and/or using gas pressure. The second magnetic material and a thin layer on the surface of the core is heated by the laser at 362 to melt the powder and the surface of the core. During this process, the magnet and/or the laser deposition system may be moved or scanned across desired locations on the surface of the core.

At 364, the method determines whether another layer (or layer portion) needs to be deposited. If yes, alignment of magnetic domains may optionally be performed at 365. If the last layer was deposited, alignment of magnetic domains may optionally be performed at 368.

Referring now to FIGS. 4A and 4B, another bi-material permanent magnet and method for manufacturing the bi-material permanent magnet is shown. In FIG. 4A, a bi-material permanent magnet 410 includes a core 416 made of the first magnetic material and a shell 414 made of the second magnetic material. The shell 414 may be formed into a desired shape using a die, an isostatic press and a source of heat to sinter the powder. In some examples, the shell 414 has a predetermined thickness and defines an outer surface and an inner cavity. The shell 414 is filled with the first magnetic material including powder and adhesive. Increased pressure and/or heat are applied to solidify the core. Alternately, the core 416 is initially formed and the shell 414 is formed around the core 416 in a desired shape using a die, an isostatic press and a source of heat to sinter the powder.

Referring now to FIG. 4B, a method 450 for manufacturing the bi-material permanent magnets is shown. At 454, a shell having a predetermined thickness is manufactured as described above using the second magnetic material. At 458, alignment of magnetic domains is optionally performed during cooling of one or more layers of the shell. At 466, the cavity of the shell is filled with powder including the first magnetic material (and an optional adhesive) and pressure and/or heat are applied to heat and/or sinter the first magnetic material. At 470, alignment of magnetic domains is optionally performed during cooling of the shell and/or core.

Referring now to FIG. 4C, a method 480 for manufacturing the bi-material permanent magnets is shown. At 484, a core is provided using any of the methods described herein. At 488, the core is arranged in a die and the shell is formed around the core 416 in a desired shape using a die, an isostatic press and a source of heat to sinter the powder. At 492, alignment of magnetic domains is optionally performed during cooling of the shell and/or core.

Referring now to FIGS. 5A and 5B, another bi-material permanent magnet and method for manufacturing the bi-material permanent magnet is shown. In FIG. 5A, a bi-material permanent magnet 510 includes a core 516 made of the first magnetic material and a shell 514 made of the second magnetic material. The shell 514 may be formed using a die, an isostatic press and a source of heat as described above. In some examples, the shell 514 has a predetermined thickness and defines an outer surface and an inner cavity. The first magnetic material is molded into the cavity. For example, transfer, compression or injection molding can be used.

In some examples, the moldable material is composed of powdered magnetic material with a polymer binder. The polymer can be a thermoset or thermoplastic. The polymer may remain after molding of the magnetic material, or may be removed during a sintering process. In the case that it remains, epoxy-based materials are typical. In the case that it is removed, polypropylene carbonate could be a typical binder.

In some examples, metal injection molding (MIM) is used. MIM is a metalworking process in which finely-powdered metal is mixed with binder material and the mixture is shaped and solidified using injection molding. The molding process allows high volume, complex parts to be shaped in a single step. After molding, the part undergoes conditioning operations to remove the binder (debinding) and densify the powders.

In some examples, powder injection molding (PIM) is used. PIM includes the use of polymeric binders that are mixed with metal or ceramic powders. The mixture is heated and forced under pressure into a die cavity. The mixture cools and the part is subsequently ejected from the die. The polymer is then removed and the component sintered to the required density.

Referring now to FIG. 5B, a method 550 for manufacturing the bi-material permanent magnets is shown. At 554, a shell having a predetermined thickness is manufactured as described above using the second magnetic material. At 558, alignment of magnetic domains is optionally performed during cooling of the shell. At 566, the first magnetic material is injection molded into the cavity. At 570, alignment of magnetic domains is optionally performed during cooling of the shell and core.

Figure 6A:
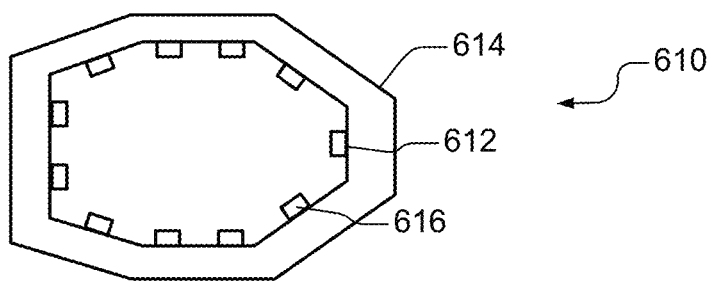
FIG. 6A is a side cross-sectional view of an example of a bi-material permanent magnet with cooling channels formed in the core according to the present disclosure.
Figure 6B:
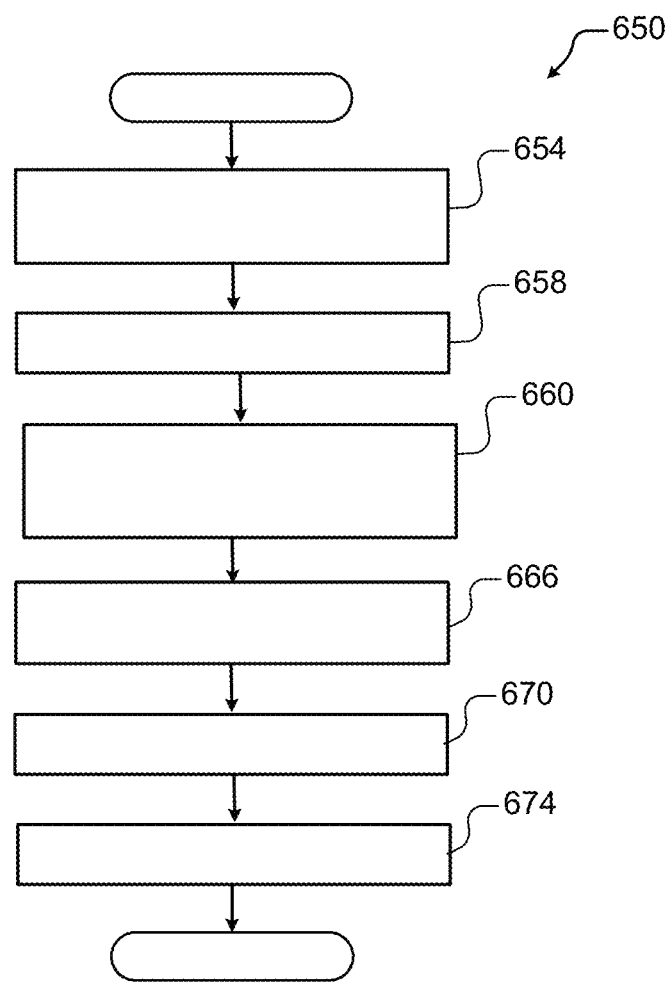
FIG. 6B is a flowchart of an example of a method for manufacturing bi-material permanent magnets of FIG. 6A according to the present disclosure.

Referring now to FIGS. 6A and 6B, another method for manufacturing the bi-material permanent magnets is shown. In FIG. 6A, a bi-material permanent magnet 610 includes a shell 612 including an outer surface and an inner cavity. An outer shell 614 made of the second magnetic material manufactured as described above. Prior to forming the core, sacrificial material is inserted into the shell 612 in one or more desired locations for cooling channels.

In some examples, the sacrificial includes a polymer, or other solid material, that can be removed by thermal degradation, combustion, dissolution, mechanical extract, or other means. The method of removal of the sacrificial material should not damage the magnetic material. For example, temperatures or solvents used to remove the sacrificial material should not negatively impact the performance of the magnetic material. The sacrificial material also should not be affected by the temperatures or pressures used to mold the magnet material. Example thermally decomposable materials include polylactic acid polymer and polypropylene carbonate polymer. Combustible materials include a system of a polymer with an oxidizer, such as ammonium nitrate or ammonium perchlorate. Soluble materials include water soluble polymers and salts, such as sodium chloride.

For example, the sacrificial material may extend from one side of the core to the opposite side (in a direction perpendicular to the page). Then, the cavity is filled with the first magnetic material as described herein. The sacrificial material is removed to form one or more channels 616. The channels 616 provide openings through which a cooling fluid such as air can flow, which helps cool the permanent magnets. The use of cooling channels may be used to offset problems such as cracking that may occur due to different coefficients of thermal expansion (CTE) between the first magnetic material and the second magnetic material.

Referring now to FIG. 6B, a method 650 for manufacturing the bi-material permanent magnets with cooling channels is shown. At 654, a shell having a predetermined thickness is manufactured as described above using the second magnetic material. At 658, alignment of magnetic domains is optionally performed during cooling of the shell. At 660, a sacrificial material is formed in the cavity in one or more desired locations for the cooling channels. At 666, the cavity is filled with the first magnetic material as described herein. At 670, alignment of magnetic domains is optionally performed during cooling of the shell and/or core. At 674, the sacrificial material is removed. In some examples, applied heat, solvents and/or other methods are used to remove the sacrificial material.

Referring now to FIGS. 7A to 7D, another bi-material permanent magnet is shown to include a core 710 and a shell 720. In FIG. 7A, the core 710 includes a laminate including one, two or more layers 714-1, 714-2, . . . 714-L (collectively layers 714) where L is an integer greater than one. The layers 714 are made of the first magnetic material and may be bonded together using an adhesive 716. The shell 720 is made of the second magnetic material and may be attached to one or more sides of the core 710 using adhesive 718.

In FIG. 7B, the shell 720 may also include two or more layers 722-1, . . . , and 722-M (collectively layers 722) where M is an integer greater than one. The layers 722 can be bonded together using an adhesive. In FIG. 7C, a portion 740 of a rotor is shown to include the bi-material permanent magnets of FIGS. 7A and 7B.

In FIG. 7D, a method 750 for manufacturing the bi-material permanent magnets is shown. At 754, a laminated magnetic core is created by bonding or otherwise attaching layers made of a first magnetic material together. At 758, a shell including one or more layers of the second magnetic material are attached to the core. If the shell is a laminate, the layers can be bonded or attached together and then the laminate can be attached to the core. Alternately, the layers of the shell can be attached to the core individually.

In FIG. 7E, the core 770 includes a laminate including two or more layers 774-1, 774-2, . . . 774-L (collectively layers 774) where L is an integer greater than or equal to one. The layers 774 are made of the first magnetic material and may be bonded together using an adhesive 776. The shell 780 is made of the second magnetic material that is divided into segments 782-1, . . . 782-S, where S is an integer greater than one and may be attached to one or more sides of the core 770 using adhesive 778. While a single layer is shown, the shell 780 may include one or more layers as shown above.

To reduce eddy currents in the magnets, the shell 780 may be subdivided in a direction transverse to a direction of magnetization as shown. The space between the magnet segments can be any non-magnetic, non-electrically conducting material. For example, the segments may be separated by air. A similar approach can be used for bi-material permanent magnets shown in FIGS. 1, 2, 4A, and 7A-7B.

Figure 8:
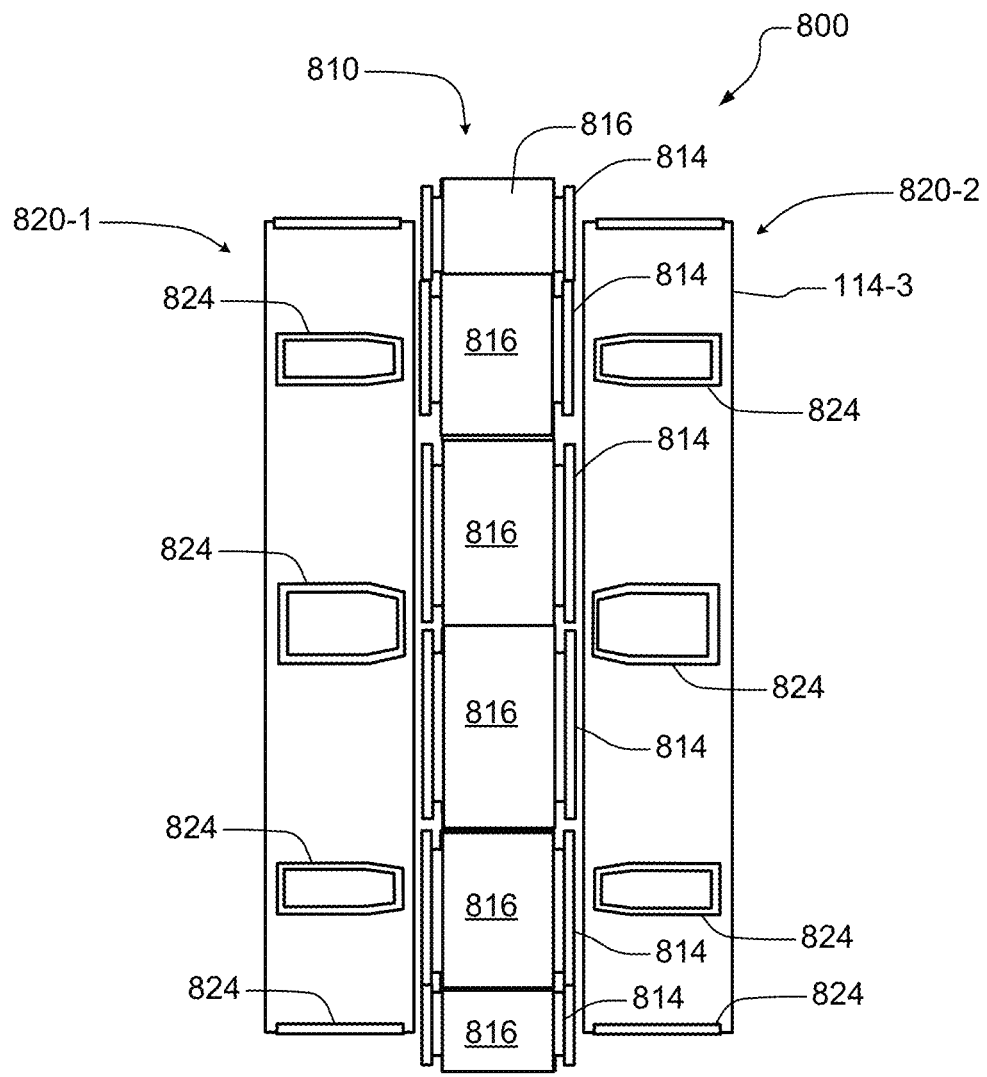
FIG. 8 illustrates an example a spoke-type axial flux machine including bi-material permanent magnets according to the present disclosure.

Referring now to FIG. 8, an example of a spoke-type axial flux machine 800 is shown to include a stator assembly 810 having a flat cylinder shape. The stator assembly 810 includes a plurality of stator winding assemblies 816 located around a radially outer surface of the stator assembly 810. Rotors 820-1 and 820-2 are located adjacent to axial side surfaces of the stator assembly 810. The rotors 820-1 and 820-2 include bi-material permanent magnets 824 described herein. While radial and axial flux machines are shown as examples herein, the bi-material permanent magnets may be used in other types of electric machines.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A rotor for an electric machine, comprising:
   a rotor portion defining a plurality of slots; and
   a plurality of bi-material permanent magnets each positioned in one of the plurality of slots, at least one bi-material permanent magnet including:
      a core including a first magnetic material and defining one or more cooling channels formed in the first magnetic material; and
      a shell portion located on the core and made of a second magnetic material,
   wherein the one or more cooling channels extend within the bi-material permanent magnet from one side of the core to an opposite side of the core and are enclosed by the shell portion of the bi-material permanent magnet,
   wherein the first magnetic material comprises a magnet material with an energy less than 20 Mega Gauss Oersteds (MGOe), and
   wherein the second magnetic material comprises a magnet material with an energy greater than 30 MGOe.

2. The rotor of claim 1, wherein the shell portion and the core form a single body.

3. The rotor of claim 1, wherein the shell portion covers an outer surface of the core.

4. The rotor of claim 1, wherein the shell portion partially covers at least one surface of the core.

5. The rotor of claim 1, wherein the shell portion has a uniform thickness on the core.

6. The rotor of claim 1, wherein the shell portion has a variable thickness on the core.

7. The rotor of claim 1, wherein the shell portion includes a first shell portion located on a first circumferential-facing surface of the core.

8. The rotor of claim 7, wherein the shell portion includes a second shell portion located on a second circumferential-facing surface of the core that is located opposite to the first circumferential-facing surface.

9. The rotor of claim 1, wherein the second magnetic material comprises a rare earth magnetic material and the first magnetic material is selected from a group consisting of a hard magnetic material and a hard magnetic compound.

10. The rotor of claim 1, wherein:
the core is made of a laminate including L layers of the first magnetic material that are bonded together, where L is an integer greater than or equal to one.

11. The rotor of claim 10, wherein:
the shell portion is bonded to the core and includes M layers of the second magnetic material, where M is an integer greater than or equal to one.

12. The rotor of claim 11, wherein the shell portion is subdivided in a plane transverse to a direction of magnetization.

13. The rotor of claim 12, wherein the subdivided shell portion includes a plurality of magnet segments.

14. The rotor of claim 13, wherein each magnet segment is separated from an adjacent magnet segment by a non-magnetic, non-electrically conducting material.

15. The rotor of claim 1, wherein the shell portion covers a plurality of surfaces of the core.

16. The rotor of claim 1, wherein:
the core includes a radial outer surface; and
the shell portion covers the entire radial outer surface of the core.

17. The rotor of claim 16, wherein the shell portion has a uniform thickness on the core.

18. The rotor of claim 16, wherein:
the core is made of a laminate including L layers of the first magnetic material that are bonded together, where L is an integer greater than or equal to one.

19. The rotor of claim 17, wherein:
the shell portion is bonded to the core and includes M layers of the second magnetic material, where M is an integer greater than or equal to one.

20. The rotor of claim 18, wherein the shell portion is subdivided in a plane transverse to a direction of magnetization.

* * * * *